Jan. 20, 1959 — H. HÜRLIMANN — 2,869,814
STAND FOR A FISHING ROD
Filed June 23, 1955 — 2 Sheets-Sheet 1
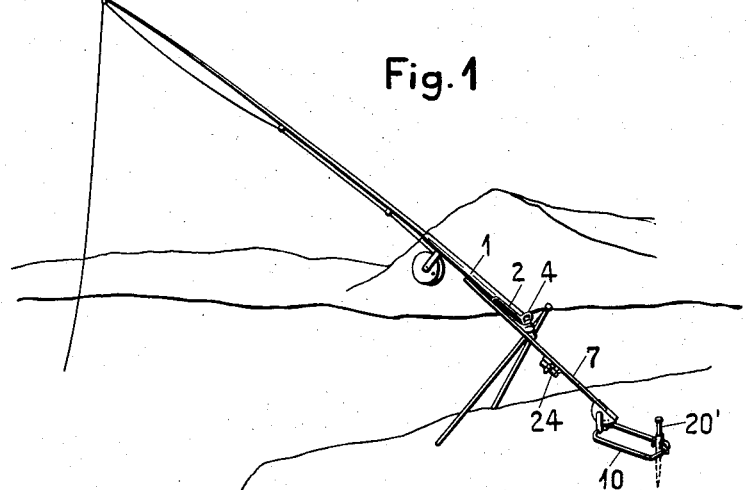
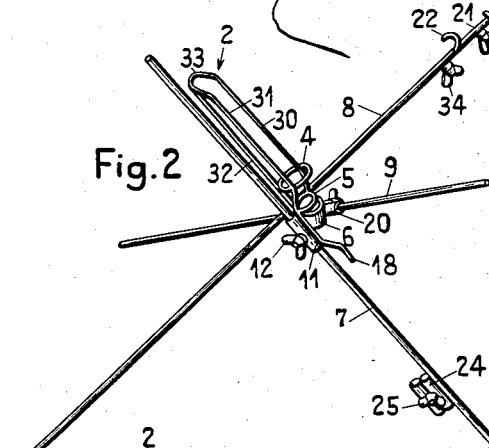
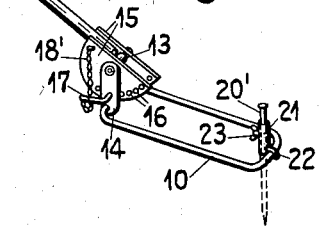
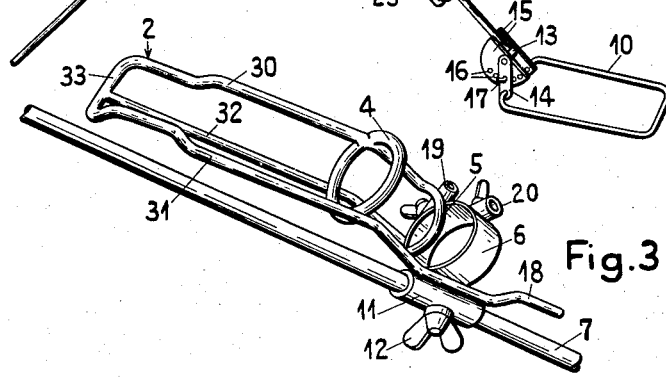
INVENTOR
HANS HÜRLIMANN Jan. 20, 1959   H. HÜRLIMANN   2,869,814
STAND FOR A FISHING ROD Filed June 23, 1955   2 Sheets-Sheet 2

INVENTOR
HANS HÜRLIMANN
Greene, Rueles and Durr

United States Patent Office 2,869,814
Patented Jan. 20, 1959

2,869,814

STAND FOR A FISHING ROD

Hans Hürlimann, Wil, Switzerland

Application June 23, 1955, Serial No. 517,612

Claims priority, application Switzerland June 28, 1954

3 Claims. (Cl. 248—48)

My invention relates to a stand for a fishing rod. It is the object of the present invention to provide a stand whereby a fishing rod may be securely held at any desired angle and at any desired distance from the ground. Further objects of my invention are to provide a stand of this type which may be firmly anchored to the ground and may be easily folded up for transportation and, in folded condition, is compact and of light weight.

Further objects of my invention will appear from the detailed description following hereinafter of a preferred embodiment thereof shown in the drawings. I wish it to be clearly undertsood, however, that such detailed description serves the purpose of illustrating the invention rather than that of restricting or limiting the same. The features of novelty will be pointed out in the claims.

In the drawings:

Fig. 1 is a perspective view of the novel stand anchored to the ground at the shore of a lake and holding a fishing rod in operative inclined position;

Fig. 2 is a perspective view of the stand, the fishing rod being removed, the view being on a larger scale than that of Fig. 1;

Fig. 3 shows a portion of Fig. 2 on a still larger scale, two of the legs shown in Fig. 2 being removed;

Fig. 4 shows the right hand portion of Fig. 1 on an enlarged scale to illustrate the foot and the means for adjustably mounting the same to the end of one of the legs of the stand;

Figure 5:
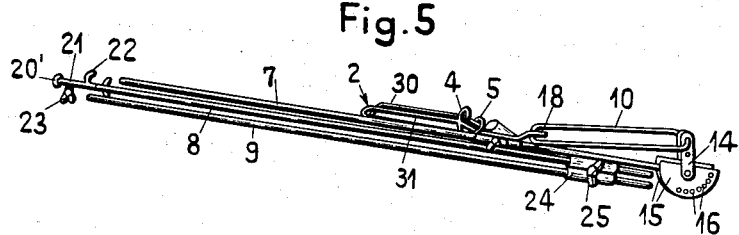
Fig. 5 is a perspective view of the stand folded up for transportation.

My novel stand comprises a cage 2 carried by a plurality of legs, preferably three legs 7, 8 and 9, and shaped to receive and hold the end of a fishing rod, such as 1, in a more or less inclined position and at any desired distance from the ground. Preferably, each of the three legs of the stand is formed by a metal tube of light weight. As the fishing rod does not form the subject matter of the invention, it need not be described. Its lower end is loosely placed in the cage 2 which preferably consists of wire. The cage 2 is of elongated shape and surrounds the fishing rod at a point near the end thereof and contacts and supports the fishing rod forwardly of said point over part of the periphery of the fishing rod and thereby permits the fishing rod to be readily placed into and taken out of the cage.

In the embodiment of the invention shown in the drawings, the cage comprises three wires 30, 31 and 32 which extend substantially parallel to each other and between their ends are fixed by welding or otherwise to a wire ring 4. At the right of this wire ring as viewed in Figs. 1, 2 and 3 the three wires 30, 31, 32 are slightly bent downwardly and their rear ends are welded or otherwise secured to a bracket 6 formed by an annular member, such as a sheet metal strip bent to an annulus. The front ends of the wires 30, 31 and 32 are connected by a member 33 which is curved to receive the fishing rod and to partly surround the periphery thereof so as to firmly brace the same against downward and lateral pull exerted by the fishing line. In the embodiment shown, the elements 31, 33 and 30 are integrally formed by a single piece of bent wire. The rear end of wire 30 is bent inwardly as shown at 5 to constitute the end stop for engagement by the end face of the fishing rod which has been placed between the wires 30, 31 and 32 and introduced through the wire ring 4. The end 5 of wire 30 may be likewise welded or otherwise secured to the bracket 6.

From this description it will be understood that the front portion of the cage 2 is open at its top for easy insertion of the fishing rod which is then displaced lengthwise and introduced through the ring 4 into contact with the end stop 5. As the rear end of the cage formed by the three wires 30, 31 and 32 is slightly bent downwardly, it permits the fisherman to grasp the rod and to tilt the same upwardly about the fulcrum constituted by the ring 4 of the cage to inspect the hook of the tackle without necessitating the removal of the fishing rod from the cage for such purpose.

Means are provided for slidably guiding the legs 7, 8 and 9 lengthwise on the cage 2 and for securing the legs to the cage in any adjusted position. In the embodiment shown, such means comprises the bracket 6, sleeves 11, 19 and 20 mounted on the bracket 6 and clamping screws, such as 12, provided on the sleeves. The legs pass through the sleeves and may be shifted lengthwise and turned therein about their axes and may be then fixed in any adjusted position by tightening the clamping screws.

From the foregoing description it will appear that each of the three legs 7, 8 and 9 is shiftable lengthwise in its sleeve 11, 19, or 20 respectively, relatively to the cage 2 and may be adjusted about its longitudinal axis and then fixed in adjusted position by means of the clamping screws, such as 12. In this manner, cage 2 may be adjusted to any desired inclination and to any desired distance from the ground. The sleeves 11, 19 and 20 may be fixed to the annular bracket member 6 by welding or otherwise or may be pivotally mounted thereon. Preferably, however, at least sleeve 11 is mounted in fixed relationship to the cage. In the embodiment shown, sleeve 11 extends parallel to the cage and is welded to the wire 31 thereof and to the annular bracket 6.

One of the legs, such as 7, which extends substantially parallel to the cage and, more particularly, to the upper section thereof, is provided with an adjustable foot 10 adapted to be anchored to the ground. Preferably, the foot is formed by a loop-shaped member, such as a wire loop.

The means for adjustably mounting the foot 10 on the end of leg 7 includes a first element formed by a pair of spaced plates 15 welded or otherwise secured to the lower end of leg 7, a second element formed by a pair of arms 14 which are pivotally mounted on the pair of plates 15 by a pivot 13, and a pin 17 which is carried by at least one of the arms 14 and adapted to be optionally introduced into one of a plurality of holes 16 provided in the pair of plates 15. In this manner, the angular relationship between the pair of plates 15 and the pair of arms 14 may be optionally determined. The arms 14 are welded or otherwise secured to the ends of the wire loop 10. Preferably, the plates 15 have a semi-circular shape and the rows of holes 16 extend parallel to part of their periphery. The pin 17 may be secured to one of the plates 15 by a chain 18' so that it cannot get lost. Depending on the desired angular position of the foot 10, the pin 17 is introduced into one or another of the holes 16. Moreover, as above mentioned, the leg 7 carrying the foot 10 may be adjusted in its axial direction relative to the cage 2 and may be turned about its axis to thereby bring the foot into a position conforming to the ground.

For the purpose of transportation the foot 10 may be folded upwardly into contact with the leg 7 as shown in Fig. 5. The cage is formed with a portion for engaging and holding the foot in such folded position. In the embodiment shown, this portion is formed by the end 18 of wire 31 extending beyond the sleeve 11.

Figure 7:
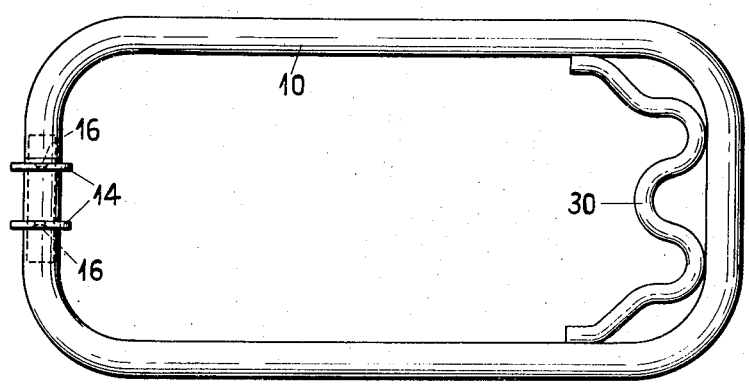
Fig. 7 is a plan view of a modification of the foot shown in Figs. 1, 2, 4 and 6.

An anchoring peg 20' which is adapted to be driven into the ground adjacent to foot 10 carries an adjustable member 21 having a hook-shaped portion 22 adapted to engage the foot 10 for anchoring the same to the ground. In the embodiment shown, the adjustable member comprises a sleeve 21 provided with the clamping screw 23. Preferably, the peg 20' is tapered at its lower end and provided with a head at its upper end. The sleeve 21 may be clamped by the clamping screw 23 to the peg at any desired position. As shown in Fig. 7, the foot 10 may be equipped with an undulated wire 30 welded or otherwise secured to the inside of the end portion of the loop 10, one of the undulations of the wire 10 being adapted to receive the peg 20' to thereby hold the foot 10 against any lateral pull. In this manner, the foot is prevented from sliding or tilting laterally.

Preferably, leg 7 extending longitudinally of the cage 2 is provided with leg-holding means, such as a pair of sleeves 24, welded thereto and provided with a clamping screw 25 adapted to project into the interior of both of the sleeves 24. When it is desired for the purpose of transportation to fold up the stand as shown in Fig. 5, the legs 8 and 9 are pulled out of the sleeves 19 and 20 and are placed into the sleeves 24 and clamped in position by the clamping screw 25. The peg 21 may be slipped into one of the tubular legs, for instance into leg 8, and clamped in position therein by means of a clamping screw 34, as shown in Figs. 2 and 5, when the peg is not being used.

Figure 6:
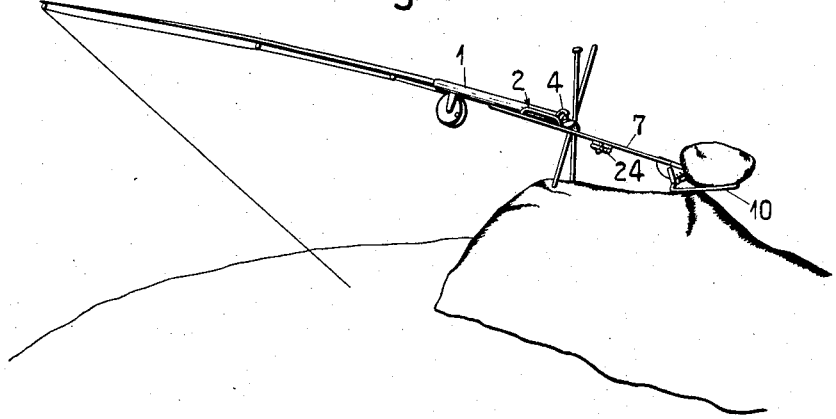
Fig. 6 is a perspective view similar to that of Fig. 1 illustrating the stand placed on a rock.

The use of my novel stand or tripod will readily appear from the foregoing description in connection with the drawings, particularly Figs. 1 and 6 thereof. Whereas in Fig. 1 the foot 10 is shown as being anchored to the ground by means of the peg 20', it may suffice to simply place a heavy object on the foot, such as a stone or a fish pail, as is illustrated in Fig. 6. In this figure the foot 10 is shown as being so angularly adjusted by means of the elements 14, 15 and 17 that it assumes a position tilted up from the ground. The stone placed on the foot constitutes a counterweight for the fishing rod.

My novel stand is of simple design and may be readily put up on any desired territory. In folded condition it requires but little space. Its use will relieve the fisherman from the physical effort of holding the fishing rod and increases the efficiency of the fishing tackle because the stand keeps the fishing rod perfectly calm and will not deter the fish by any however slight movements. As the fisherman is relieved from the necessity of holding the rod himself, he may use a longer and heavier rod which frequently is of advantage.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A stand for a fishing rod comprising in combination, a bracket member, three sleeve members fixed on said bracket member with the axes thereof extending in different directions, three rod-like leg members one for each sleeve member, each rod-like leg member being slidable in its particular sleeve member, means for clamping each of said rod-like leg members in any desired fixed position in its sleeve member, an elongated cage member for holding a fishing rod mounted on said bracket and also attached to one of said sleeve members, said cage member extending in the same general direction as the axis of the sleeve member to which it is attached whereby any portion of the leg which is fixed in said last mentioned sleeve member extends in the same general direction of said cage member and in the same general direction as a fishing rod held by said cage member.

2. A stand for a fishing rod as claimed in claim 1 comprising an anchoring member comprising a metal loop pivotally fixed to the lower end of the leg which extends parallel to said cage member.

3. A stand for a fishing rod as claimed in claim 1 wherein said bracket member consists essentially of a ring and wherein said cage member and said sleeve members are all welded to said ring.

References Cited in the file of this patent

UNITED STATES PATENTS

| | | |
|---|---|---|
| 1,144,726 | Robinson et al. | June 29, 1915 |
| 1,445,239 | Redding | Feb. 13, 1923 |
| 2,306,442 | Holmes | Dec. 29, 1942 |
| 2,430,112 | Hamre | Nov. 4, 1947 |
| 2,618,090 | Kimura | Nov. 18, 1952 |
| 2,674,426 | Hiles | Apr. 6, 1954 |
| 2,763,453 | Palino | Sept. 18, 1956 |

FOREIGN PATENTS

| | | |
|---|---|---|
| 77,644 | Norway | Oct. 30, 1950 |
| 1,079,386 | France | May 19, 1954 |